United States Patent [19]

Aso

[11] Patent Number: 5,058,175
[45] Date of Patent: Oct. 15, 1991

[54] QUALITY INSPECTION METHOD FOR A PRINTED MATTER

[75] Inventor: Itsuo Aso, Mihara, Japan

[73] Assignee: Mitsubishi Jukogyo Kabushiki Kaisha, Tokyo, Japan

[21] Appl. No.: 463,515

[22] Filed: Jan. 11, 1990

[51] Int. Cl.⁵ ............................................. G06K 9/00
[52] U.S. Cl. ...................................... 382/1; 356/394; 382/34
[58] Field of Search ................... 382/1, 50, 63, 53, 34; 356/390, 394, 398, 434, 237

[56] References Cited

U.S. PATENT DOCUMENTS

| | | | |
|---|---|---|---|
| 3,756,725 | 9/1973 | Manring | 356/195 |
| 3,970,393 | 7/1976 | Krygeris et al. | 356/195 |
| 4,685,139 | 8/1987 | Masuda et al. | 382/1 |
| 4,760,464 | 7/1988 | Sakano | 382/53 |

FOREIGN PATENT DOCUMENTS

| | | |
|---|---|---|
| 2917519 | 7/1980 | Fed. Rep. of Germany . |
| 2066949 | 7/1981 | United Kingdom . |

Primary Examiner—Leo H. Boudreau
Attorney, Agent, or Firm—Wenderoth, Lind & Ponack

[57] ABSTRACT

The known quality inspection method for printing matter, in which a printed pattern on the printed matter is optically imaged on photo-sensitive elements and the depth of the print of the printed matter is detected by converting intensities of light incident the respective photo-sensitive elements to electrical quantities, is improved. The improvements reside in that from momentarily changing detection signals are obtained by optically scanning the printed matter during its travel, detection signals generated in a particular area are extracted to be used as a reference signal, and anomalies occurring in the printed matter are detected by comparing the momentarily changing detection signals with the reference signal. Preferably, the particular area is an unprintable area, and detection signals generated from a printed area are compared with the reference signal. More preferably, detection signals generated from a non-patterned area are compared with the reference signal. In a modified embodiment, detection signals obtained by optically scanning print depth variations in an ink key width unit of the printed matter are compared with detection signals from normal printed matter which were preliminarily detected by employing a method similar and stored for use as a reference signal.

4 Claims, 3 Drawing Sheets

QUALITY INSPECTION METHOD FOR A PRINTED MATTER

BACKGROUND OF THE INVENTION

1. Field of the Invention

The present invention relates in general to a quality inspection method for inspecting printed matter, and more particularly to a method for setting a reference value to be used in the detection of white damage and/or black damage caused by an insufficiency and/or surplus of fed ink upon the commencement of printing and to such a method for detecting the white damage and/or the black damage.

Also the present invention relates to a method for inspecting print depth variations, that is applicable in the detection of a defective printing of a pattern such as figures, characters and the like on printed matter and in the detection of various contaminations of printed matter.

2. Description of the Prior Art

Heretofore, a method of inspecting printed matter which relied upon human visual sense on an off-line basis was principally employed. This is due to the facts that printed matter has different print patterns at various locations thereon, and that it has been believed that the inspection of printed matter requires the detection of slight differences that can only be determined by human visual sense. On the other hand, in response to the desirability to evaluate printed matter during printing, judgements were made during printing after converting an image on printed matter into a stationary image by effecting stroboscopic illumination synchronized with the printing speed or by employing a rotary mirror rotating at a high speed synchronously with the printing speed. However, even these measure cannot be considered automated in view of the fact that such inspection methods also rely upon human visual sense. In addition, another inspection method has been carried out in which a color patch is printed simultaneously with the printing of the pattern of printed matter and an inspection of the printed matter is simulated by inspecting the color patch. However, according to this method, in the event that printing faults (oil dropping, contamination, etc.) should arise in the pattern, they would be overlooked, and so, it cannot be said that such a method will function as effectively as an automated inspection machine.

On the other hand, in the "printed matter inspection apparatus" proposed recently in Laid-Open Japanese Patent Specification No. 56-98634 (1981) or Laid-Open Japanese Patent Specification No. 59-109832 (1984), a system for inspecting printed matter on an in-line basis by making use of a line sensor is disclosed. This system will be outlined with reference to FIG. 8.

A web-like printing paper sheet 3 fed from a roll of paper 2 mounted in a feeder section of a printing machine is, after being printed in a printing section 1, conveyed to a dryer and a folding machine (not shown). In the "printed matter inspection apparatus", in order to inspect a printed condition after printing commences, pattern information detected by a line sensor in a detecting section 4 is input to a processor circuit 6 while the timing for sampling is controlled by a rotary encoder 5 mounted to the printing section, and the pattern information is judged. As a result, if the printed condition has been judged to be abnormal, the apparatus can respond by issuing an alarm, marking the abnormal portion, rejecting the printed matter and the like.

According to the above-described system, since an entire patterned area of printed matter can be automatically inspected on an in-line basis, the previously described shortcomings are not present, and an advantageous inspection can be carried out.

The image information input through the detecting section 4 serves double roles as reference information and as inspection information within the processor circuit 6. The reference information is image information of a pattern on the printed matter at the time when an operator has judged that printing is normal, and this image information is stored within a reference information memory. On the other hand, the inspection information is information input from the detecting section 4 after the reference information has been stored in the memory, and which inspection information is compared with the above-described reference information. Whether the printed matter is acceptable or not is determined by judging whether the difference between the reference information and image information has exceeded a preset allowable limit, and thus the inspection of the printed matter is conducted on an in-line basis.

It will be understood that when employing the above-mentioned system, before the reference information is input to processor circuit 6, that is, during the period from the commencement of printing to the time normal printing occurs, inspection of the printed matter is impossible.

In practice, since unacceptable printed matter occurs in large amounts during the period from the commencement of printing to the time a normal printing state arises, especially in a rotary press in which there consequently occurs a large loss of printing paper, after the commencement of printing it is desired to automatically determine the exact point in time at which normal printing has begun. It is obvious that the printed matter inspecting apparatus according to the above-described prior invention is not effective at all in meeting this desire, and a solution to this problem is still sought.

In addition, according to the above-described system shown in FIG. 8, while it becomes possible to inspect an entire pattern on printed matter, the reference information and the inspection information to be processed constitute a large amount of information. Hence, the inspection apparatus in the prior art must have a complicated processing unit, is slow to carry out the inspection or carries out the inspection with insufficient accuracy.

SUMMARY OF THE INVENTION

An object of the present invention is to overcome the above-mentioned problems in the prior art, and it is accordingly one object of the present invention to provide a method for producing reference information in a printed matter inspection apparatus in a manner in which the inspection of printed matter can be carried out immediately after the commencement of printing, and to provide a method for detecting decoloring (white damage) caused by an insufficiency in the amount of ink fed to the printed matter upon the commencement of printing or for detecting contamination of a background (black damage) caused by a surplus in the amount of ink fed.

Another object of the present invention is to provide a quality inspection method for inspecting variations in the depth of print of printed matter with a sufficient inspection accuracy and at a sufficiently high inspection speed by making use of an apparatus having a relatively simple structure.

According to one feature of the present invention, there is provided a quality method for inspecting printed matter, wherein a printed pattern on the printed matter is optically imaged on photo-sensitive elements and the depth of print of the printed matter is detected by converting intensities of light incident on the respective photosensitive elements to electrical quantities, and moreover, in which momentarily changing detection signals are generated by optically scanning the printed matter during its travel, detection signals generated in a particular area are extracted to be used as a reference signal, and anomalies occurring in the printed matter are detected by comparing the momentarily changing detection signals with the reference signal.

According to another feature of the present invention, there is provided the above-featured quality inspection method, wherein among the detection signals, those generated from an unprinted area are used as the reference signal, and detection signals generated from a printed area are compared with this reference signal.

According to still another feature of the present invention, there is provided the first-featured quality inspection method, wherein among the detection signals, those generated from an unprinted area are used as the reference signal, and detection signals generated from a non-patterned area are compared with this reference signal.

According to yet another feature of the present invention, there is provided a quality inspection method, wherein a printed pattern on printed matter is optically imaged on photo-sensitive elements and the depth of the print of the printed matter is detected by converting intensities of light incident on the respective photo-sensitive elements to electrical quantities, and moreover, in which anomalies occurring in the printed matter are detected by comparing detection signals obtained by optically scanning print depth variations in an ink key width unit of the printed matter with detection signals from normal printed matter which were preliminarily detected through a method similar to the above method and stored for use as a reference signal.

In other words, in the method according to the present invention, the setting of reference information during the period from the commencement of printing to normal printing is carried out by determining a normal area of the printed matter from among inspection information possessed by the processor circuit 6 in FIG. 8 and using the information obtained from the determined particular area as reference information.

Next, white damage (decoloring caused by an insufficiency in the amount of ink fed, and which is generated entirely or partly on the printed paper surface) and/or black damage (contamination of the background of the printed matter caused by a surplus in the amount of ink fed, and which is generated entirely or partly on the printed paper surface) from the commencement of printing to normal printing, is detected by comparing one portion of inspection information generated from the printed matter during its travel with reference information extracted from another portion of the same inspection information, and determining that the printed matter has white damage when the difference yielded from such a comparison is less than a predetermined value.

Also, in the method according to the present invention, from the reference information stored in the processor circuit 6 in FIG. 8, an area of the printed matter where print depth variations are liable to occur is used to generate reference data. A portion is used to generate inspection data. And by comparing the reference data with the inspection data, defects in the quality of the printed matter are determined.

In the above-mentioned process of presetting reference information according to the present invention, image information of the traveling printed matter is input moment-by-moment to the processor circuit 6 shown in FIG. 8, and accumulates as inspection information in an inspection information memory. Among this inspection information, detection data is generated from the printing paper itself in an unprintable area of a printed matter, that is, in an unprinted area the information extracted is used to generate the reference data.

Next, in the above-described white damage inspection method according to the present invention, the inspection information is divided into blocks corresponding to respective ink control widths, that is, into blocks corresponding to those widths over which ink feed rates can be controlled by means of the respective ink keys. And, with respect to the respective divided widths the detection data are compared with the above-mentioned reference information, and when a difference less than a predetermined value exists, the printed matter is determined to have white damage.

Also, in the above-described black damage inspection method according to the present invention, among the inspection information, detection data generated from a non-patterned section in the printed area (the portion where a printed pattern is not present though printing is possible) are compared with the above-mentioned reference information, and when a difference larger than a predetermined value exists, the printed matter is determined to be unacceptable.

Through the above-mentioned method, even when normal printed matter is not produced upon the commencement of printing, the detection of white damage and/or black damage from only momentarily detected inspection information becomes possible.

Furthermore, in the inspection method according to the present invention, image information detected from traveling printing matter is accumulated in the processor circuit 6 in FIG. 8. The processor circuit 6 stores reference data generated from a portion of the printed matter and inspection data generated moment-by-moment from the pattern on the printed matter. Variations in the depth of ink are caused by insufficiencies or surpluses in the amount of ink fed to a plate drum 8 as controlled by ink keys (not shown) provided in a printing section 1 in FIG. 8. Accordingly, print depth variations can be detected for each of the respective widths over which the ink keys control the amount of ink fed to the plate drum 8.

The above-mentioned reference information is divided into blocks corresponding to the respective ink keys, and the respective blocks of reference information are extracted to generate the reference data. In addition, the inspection information, corresponding to the reference data, is also extracted to generate inspection data. The above-mentioned reference data and inspection data are compared with each other, and when a difference larger than a predetermined value is present, the printed matter is determined to have unacceptable variations in the depth of print.

The above-mentioned and other objects, features and advantages of the present invention will become more apparent by referring to the following description of the preferred embodiments of the invention taken in conjunction with the accompanying drawings.

DETAILED DESCRIPTION OF THE PREFERRED EMBODIMENTS

At first, the first preferred embodiment of the present invention will be described with reference to FIGS. 1, 2 and 8.

Figure 1:
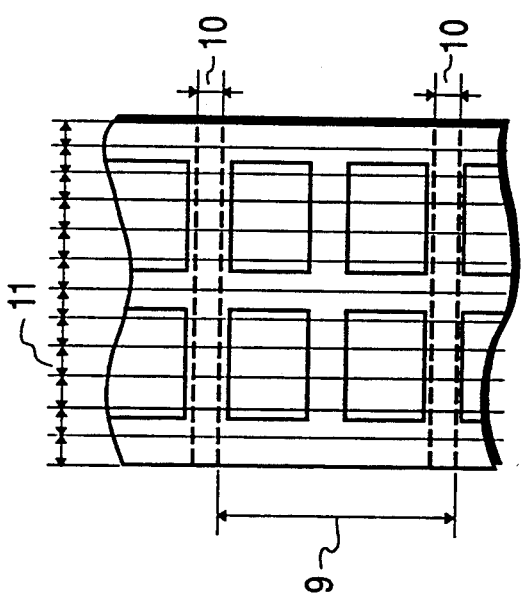
FIG. 1 is a schematic view of printed matter which can be inspected according to a first preferred embodiment of the present invention.

In FIG. 1 showing printed matter, the length of one page 9 corresponds to one revolution of a plate drum 8 or a rubber drum 7. An unprinted section 10 is that portion of the printed matter which is unprintable due to the presence of a gap on the plate drum 8 or the rubber drum 7. An ink control width 11 designates the width of an ink key (not shown) for controlling the amount of ink fed to the plate drum 7 in the printing section 1.

Figure 2:
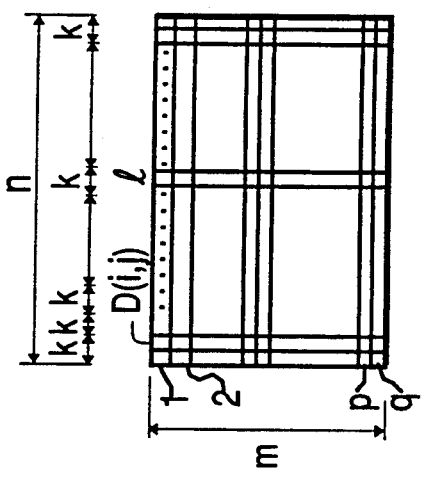
FIG. 2 is a schematic view of a memory array of inspection information for one page of the printed matter shown in FIG. 1.
Figure 8:
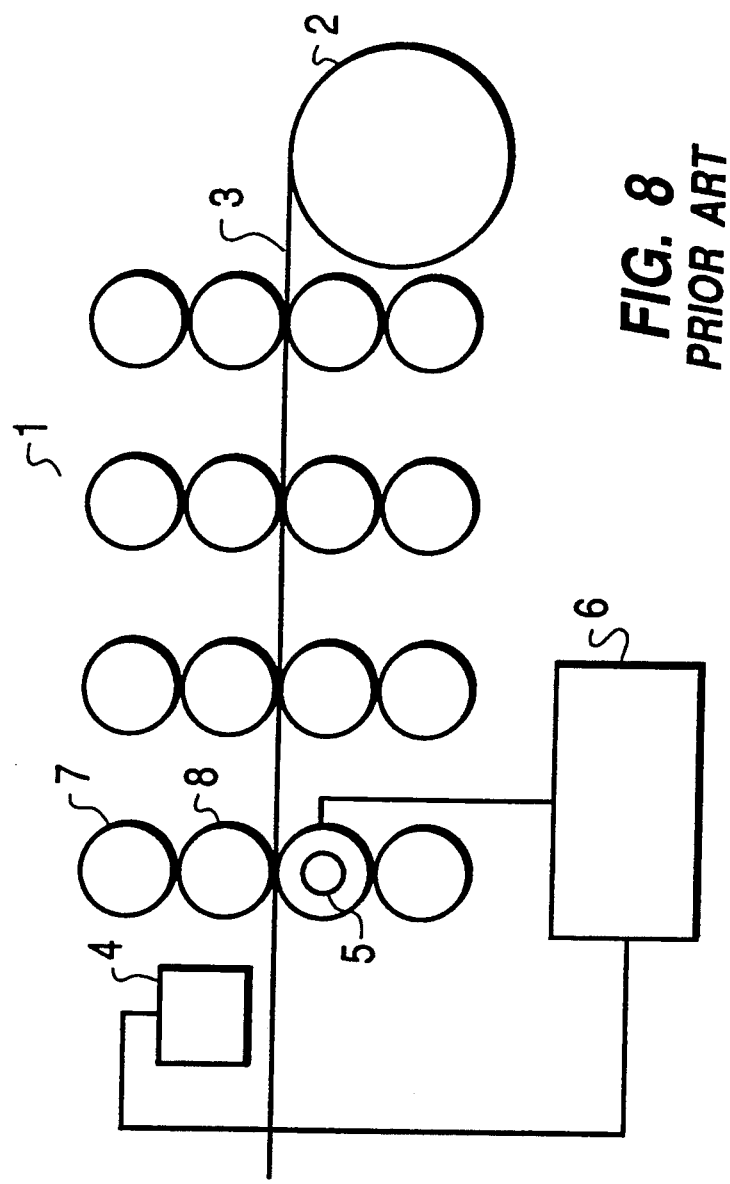
FIG. 8 is a schematic diagram of an inspection apparatus in the prior art.

FIG. 2 shows one example of a memory array of pattern information, that is, inspection information for one page 9 of the printed matter, which has been input to the processor circuit 6 in FIG. 8.

In FIG. 2, in the widthwise direction of the paper sheet, the area is divided into units n depending upon the number of detector elements in a line camera or the like provided in detector section 4. And, in the traveling direction the area is divided into units m depending upon the sampling timing of rotary encoder 5. Accordingly, inspection information corresponding to one page is composed of an array of picture elements (m × n).

Here it is assumed that each ink control width 11 is composed of columns k, and along the width of the printing paper are present N ink control widths.

Also, it is assumed that the memory array corresponding to an unprinted section 10 consists of the p-th to q-th rows.

Here, inspection information for any arbitrary picture element in the i-th row and in the j-th column of the memory array is represented by D (i, j), and one column is arbitrarily selected from each ink control width 11.

For instance, if an average picture element in the ink control width corresponding to the l-th column is represented by $DT_l$, then $DT_l$ can be represented by the following formula:

$$DT_l = \sum_{i=1}^{p-1} D(i, l)/(p - 1) \qquad (1)$$

Also, if an average picture element of inspection information in the l-th column in the unprinted section 10 is represented by $NR_l$, then $NR_l$ can be represented by the following formula:

$$NR_l = \sum_{i=p}^{q} D(i, l)/(q - p + 1) \qquad (2)$$

In the case where black damage is occurring due to the contamination of the background of the printed matter or the like upon the commencement of printing, or during normal printing when ink is being transferred to the printed section, then $DT_l \neq NR_l$. In the event that the amount of fed ink controlled by an ink key corresponding to the l-th column is insufficient, that is, upon the occurrence of white damage, $DT_l$ would approach $NR_l$. Hence, if the latitude for one picture element that is allowed for normal printed matter is represented by $\epsilon$, then when the following relation is fulfilled, the traveling printed matter will be judged to have white damage:

$$|DT_l - NR_l| \leq \epsilon \qquad (3)$$

The comparison represented by the formula (3) above is carried out for all of the ink control widths. This latitude $\epsilon$ can be preliminarily measured through experiments or the like, and can be preset in the processor circuit 6.

According to the present invention, the inspection for white damage upon the commencement of printing becomes possible, on the basis of only inspection information, and without the necessity of preliminarily inputting reference information to the processor circuit.

Here, the comparison between an ink control width 11 and the unprinted section 10 could be carried out in two columns or more, and any one column of the ink control width 11 may be divided into respective blocks for the comparison.

Next, a second preferred embodiment of the present invention will be explained with reference to FIGS. 3, 4 and 8.

Figure 3:
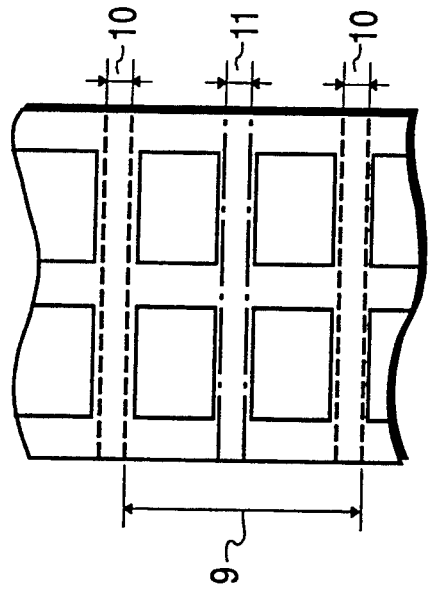
FIG. 3 is a schematic view of printed matter which can be inspected according to a second preferred embodiment of the present invention.

In FIG. 3 showing an outline of printed matter, the length of one page 9 corresponds to one revolution of a plate drum 8 or a rubber drum 7. An unprinted section 10 is that portion of the printed matter which is unprintable due to the presence of a gap on the plate drum 8 or the rubber drum 7.

And, a non-patterned section 11 is a portion of the printed matter where a pattern is present but ink is not transferred thereto during printing owing to the configuration of the pattern. Accordingly, during normal printing this non-patterned section remains the same color as that of the printing paper similar to the unprinted section.

Figure 4:
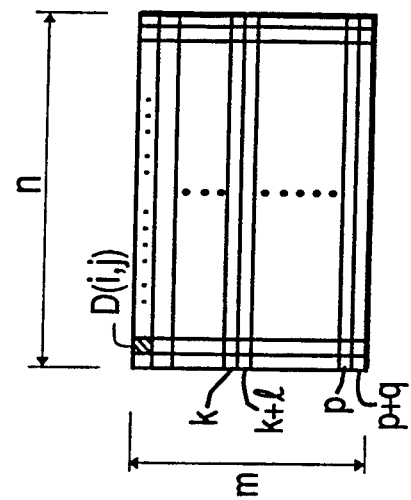
FIG. 4 is a schematic view of a memory array of inspection information for one page of the printed matter shown in FIG. 3.

FIG. 4 shows one example of a memory array of pattern information, that is, inspection information for one page 9 of the printed matter, shown in FIG. 3, which has been input to the processor circuit 6 in FIG. 8.

In FIG. 4, in the widthwise direction of the paper sheet, the area is divided into units n depending upon a number of detector elements in a line camera or the like provided in detection section 4. And, in the traveling direction the area is divided into units m depending upon the sampling timing of rotary encoder 5. Accordingly, inspection information corresponding to one page is composed of an array of picture elements (m×n).

Here it is assumed that the memory array corresponding to the non-patterned section 11 in FIG. 3 consists of the k-th to (k+l)-th rows in FIG. 4.

Also it is assumed that the memory array corresponding to the unprinted section 10 consists of the p-th to (p+q)-th rows.

Here, if any arbitrary picture element in the i-th row and in the j-th column of the memory array is represented by D (i, j), then a sum $ND_k$ of the inspection information in the k-th row in the non-patterned section 11 is represented by the following formula:

$$ND_k = \sum_{j=1}^{n} D(k, j) \quad (4)$$

Also, a sum $NR_p$ of the inspection information in the p-th row in the unprinted section 10 is represented by the following formula:

$$NP_p = \sum_{j=1}^{n} D(p, j) \quad (5)$$

If black damage occurs only at the non-patterned section due to the contamination of the background of the printed matter upon the commencement of printing, $ND_k \neq NR_k$.

As the printing becomes closer to normal printing, $ND_k$ approached $NR_k$.

Hence, if the error, corresponding to one row, that is allowed for normal printed matter is represented by $\epsilon_1$, then when the following relation is fulfilled, traveling printed matter will not have black damage:

$$|ND_k - NR_k| \leq \epsilon_1 \quad (6)$$

The allowable error $\epsilon_1$ can be preliminarily measured through experiments or the like, and can be preset in the processor circuit 6.

According to the present invention, the inspection for black damage upon the commencement of printing becomes possible, on the basis of only inspection information, and without the necessity of preliminarily inputting reference information to the processor circuit.

Hence, the unit of comparison between the non-patterned section 11 and the unprinted section 10 could be every column, and if the non-patterned section 11 and the unprinted section 10 have the same area, that is, if l=q, the total sums in the respective sections could be compared.

More particularly, if the total sum of the inspection information in the non-patterned section 11 is represented by ND, it is given by the following formula:

$$ND = \sum_{i=k}^{k+l} \sum_{j=1}^{n} D(i, j) \quad (7)$$

If the total sum of the inspection information in the unprinted section 10 is represented by NR, it is given by the following formula:

$$NR = \sum_{i=p}^{p+q} \sum_{j=1}^{n} D(i, j) \quad (8)$$

And, if the latitude for error in the total sum is represented by $\epsilon$, when the following relation is fulfilled, the printed matter will not have black damage:

$$|ND - NR| \leq \epsilon \quad (9)$$

Otherwise, the inspection information of one row consisting of units n is divided into N blocks, and a comparison could be made by presetting latitude values for the respective blocks.

Figure 5:
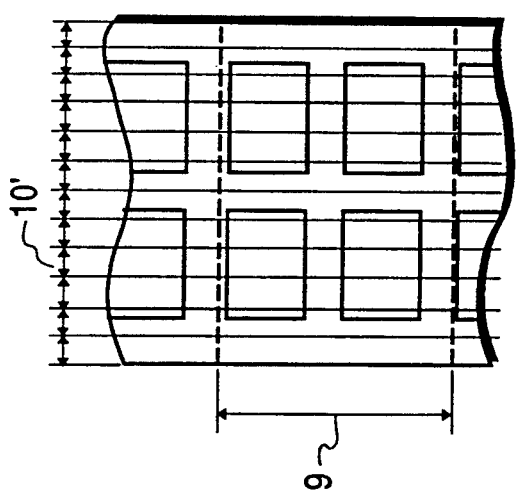
FIG. 5 is a schematic view of printed matter which can be inspected according to a third preferred embodiment of the present invention.

Now a third preferred embodiment of the present invention will be described with reference to FIGS. 5, 6, 7 and 8. FIG. 5 shows printed matter. In FIG. 5, the length of one page 9 corresponds to one revolution of a plate drum 8 or a rubber drum 7 in FIG. 8. An ink control width 10' corresponds to the width of an ink key (not shown) for controlling the amount of ink fed to the plate drum 8 in the printing section 1 in FIG. 8.

Figure 6:
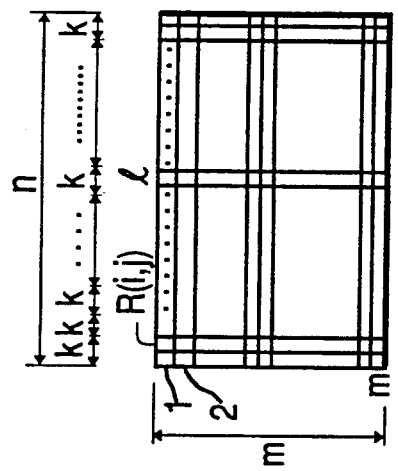
FIG. 6 is a schematic view of a memory array of reference information for one page of the printed matter shown in FIG. 5.
Figure 7:
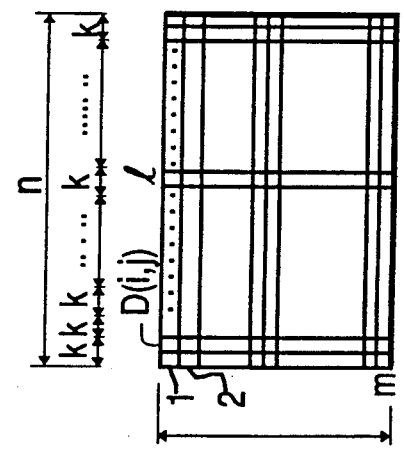
FIG. 7 is a schematic view of another memory array of inspection information for another page of the printed matter shown in FIG. 5.

FIG. 6 shows one example of a memory array of reference information for one page 9 of the printed matter shown in FIG. 5, which information is input to the processor circuit 6 in FIG. 8. FIG. 7 shows one example of a memory array of inspection information for another page 9 of the printed matter shown in FIG. 5, which information is also input to the processor circuit 6 in FIG. 8.

In FIG. 6, in the widthwise direction of the paper sheet the area is divided into units n depending upon the number of detector elements in a line camera or the like provided in detector section 4. And, in the traveling direction the area is divided into units m depending upon the sampling timing of rotary encoder 5. Accordingly, inspection information corresponding to one page is composed of an array of picture elements (m×n).

Here it is assumed that each ink control width 10' in FIG. 5 is composed of columns k of picture elements and there are N ink control widths over the width of the printing paper sheet.

Here, reference information for any arbitrary picture element in the i-th row and in the j-th column of the memory array is represented by R (i, j) and any one column is selected from each ink control width 10'. If a total sum of the reference information in the ink control width corresponding to, for example, the l-th column is used as reference data and represented by $RF_l$, then $RF_l$ can be represented by the following formula:

$$RF_l = \sum_{i=1}^{m} R(i, l) \quad (10)$$

Likewise in FIG. 7, if the inspection information for any arbitrary picture element in the i-th row and in the j-th column of the inspection information memory array is represented by D (i, j), and if a total sum of the inspection information in the l-th column of the same memory array is used as inspection data and represented by $DT_l$, then $DT_l$ can be represented by the following formula:

$$DT_l = \sum_{i=1}^{m} D(i, l) \quad (11)$$

During printing, in the event that the amount of fed ink controlled by an ink key corresponding to the l-th column has become excessive or insufficient, $RF_l \neq DT_l$. As the printing becomes closer to normal printing, $DT_l$ approaches $RF_l$.

Therefore, if a latitude for one column in the traveling direction that is allowed for normal printed matter is represented by $\epsilon$, when the following relation is satisfied, the portion of the printed matter corresponding to the ink key width including the l-th column, will be judged to be normal:

$$|DT_l - RF_l| \leq \epsilon \qquad (12)$$

If the above-described method is practiced for all N of the ink control widths, then the inspection of the depth of printing over the entirety of printed matter can be achieved.

Here, the comparison between the reference data and the inspection data in each ink control width $10'$ is not limited to be carried out in only one column as described above, but can be carried out in two columns or more. Alternatively, any one column within an ink control width $10'$ could be divided into blocks, and a comparison of the respective blocks could be carried out.

In a quality inspection method for printed matter of the type in which a printed pattern on the printed matter is optically imaged on photo-sensitive elements and the depth of the print of the printed matter is detected by converting intensities of light incident on the respective photosensitive elements to electrical quantities, according to the present invention momentarily changing detection signals are generated by optically scanning the printed matter during its travel, detection signals generated in a particular area are extracted to be used as a reference signal, and anomalies occurring in the printed matter are detected by comparing the momentarily changing detection signals with the reference signal. Therefore, the present invention provides the following advantages:

(1) A quality inspection of printed matter from the commencement of printing to normal printing can be carried out, which was impossible to realize by employing the printed matter inspection apparatus in the prior art.

(2) Inspection for white damage and/or black damage by numerical management employing a predetermined reference, and which does not rely upon the visual sense of an inspector, becomes possible.

(3) The switch from unacceptable printing in which white damage and/or black damage is present to normal printing is effected smoothly, and waste printing paper is reduced.

In a quality inspection method for printed matter of the type in which a printed pattern on the printed matter is optically imaged on photo-sensitive elements and the depth of the print of the printed matter is detected by converting intensities of light incident on the respective photosensitive elements to electrical quantities, according to the present invention anomalies occurring in the printed matter are detected by comparing detection signals obtained by optically scanning print depth variations in an ink key width unit of the printed matter with detection signals which were previously generated from a particular area of the printed matter by a method similar to the above method and stored for use as reference signals. Therefore, the present invention also provides the following advantages:

(1) Inspection of print depth variations in a pattern over the entirety of the printed matter through a small number of comparative inspections becomes possible, and it is also possible to improve the speed at which the inspection is carried out.

(2) Since the inspection depends upon numerical management without relying upon the visual sense of an inspector, print depth inspection not relying upon an inspector but relying upon a fixed reference becomes possible.

(3) Print depth variations occurring during printing can be detected. Hence, it is possible to quickly deal with generated printing faults, and waste printing paper is reduced.

While a principle of the present invention has been described above in connection with preferred embodiments of the invention, it is a matter of course that many apparently widely different embodiments of the present invention could be made without departing from the spirit of the present invention.

What is claimed is:

1. A method of inspecting printed matter as the matter is being printed by a printing apparatus, said method comprising:

conveying the printed matter past an image detection system having photosensitive elements;

optically imaging the printed matter onto the photosensitive elements of the image detection system by reflecting light off of the printed matter and onto the photosensitive elements as the printed matter travels past the detection system;

producing detection signals, corresponding to the depth of print of the printed matter, as soon as the printed matter travels past the detection system immediately after the commencement of printing by converting the intensities of light incident on the photosensitive elements to electrical quantities;

storing the detection signals derived from a particular area of the printed matter as a reference signal;

comparing the reference signal with the detection signals subsequently produced thereto; and analyzing the comparison of the reference signal with the subsequently produced detection signals to detect anomalies occurring in the printed matter.

2. A method as claimed in claim 1, wherein the step of storing the detection signals comprises storing the detection signals generated from an area that is unprintable due to the make-up of the apparatus carrying out the printing, and the step of comparing the reference signal with the subsequently produced detection signals comprises comparing the reference signal with detection signals subsequently derived from a printed portion of the pattern of the printed matter.

3. A method as claimed in claim 1, wherein the step of storing the detection signals comprises storing the detection signals generated from an area that is unprintable due to the make-up of the apparatus carrying out the printing, and the step of comparing the reference signal with the subsequently produced detection signals comprises comparing the reference signal with detection signals subsequently derived from a non-printed portion of the pattern of printed matter.

4. A method of inspecting printed matter as the printed matter is being printed by printing apparatus having printing keys that respectively control the amount of ink fed to widthwise units of the printed matter, said method comprising:

conveying the printed matter past an image detection system having a line of photosensitive elements of a number of at least equal to the number of ink keys and extending in a widthwise direction of the printed matter;

optically imaging the printed matter onto the photosensitive element of the image detection system by reflecting light off of the printed matter and onto the photosensitive elements as the printed matter travels past the detection system; p1 producing detection signals, corresponding to the depth of print of the printed matter at each of the widthwise units thereof, as soon as the printed matter travels past the detection system immediately after the commencement of printing by converting the intensities of light incident on the photosensitive elements to electrical quantities;

storing the detection signals derived from the widthwise units of a preliminary portion of the printed matter traveling past the detection system as reference signals in the form of an array;

comparing the reference signals in the array, respectively, with the detection signals derived from corresponding widthwise units of another portion of the printed matter which has passed the detection system subsequent to said preliminary portion; and analyzing the comparison of the reference signals with the subsequently produced detection signals derived from the corresponding widthwise units of the printed matter to detect anomalies occurring the in printed matter.

* * * * *